United States Patent
Dorrer et al.

(10) Patent No.: US 7,126,739 B2
(45) Date of Patent: Oct. 24, 2006

(54) METHOD AND APPARATUS FOR OPTICAL PULSE CHARACTERIZATION USING SIMPLIFIED CHRONOCYCLIC TOMOGRAPHY

(75) Inventors: Christophe J Dorrer, Matawan, NJ (US); Inuk Kang, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/067,777

(22) Filed: Feb. 28, 2005

(65) Prior Publication Data

US 2006/0193027 A1   Aug. 31, 2006

(51) Int. Cl.
*G02F 1/01*   (2006.01)

(52) U.S. Cl. ...................... 359/279; 359/278

(58) Field of Classification Search ............... 359/279, 359/245, 240, 238, 300, 315, 278; 398/183, 398/185, 187, 188
See application file for complete search history.

(56) References Cited

OTHER PUBLICATIONS

M. Nakazawa et al., "1.28 Tbit/s-70km OTDM Transmission Using Third- and Fourth-Order Simultaneous Dispersion Compensation With A Phase Modulator", *Electronics Letters*, vol. 36, No. 24, Nov. 23, 2000, pp. 2027-2029.

A. H. Gnauck et al., "1-Tb/s (6×170.6 Gb/s) Transmission Ovr 2000-km NZDF Using OTDM and RZ-DPSK Format", *IEEE Photonics Technology Letters*, vol. 15, No. 11, Nov. 2003, pp. 1618-1620.

S. A. Hamilton et al., "100 Gb/s Optical Time-Division Multiplexed Networks", *Journal of Lightwave Technology*, vol. 20, No. 12, Dec. 2002, pp. 2086-2100.

K. R. Tamura et al., "50 GHz Repetition-Rate, 280-fs Pulse Generation at 100-mW Average Power From A Mode-Locked Laser Diode Externally Compressed in a Pedestal-Free Pulse Compressor", *Optics Letters*, vol. 27, No. 14, Jul. 15, 2002, pp. 1268-1270.

C. Dorrer et al., "Real-Time Implementation of Linear Spectrograms for the Characterization of High Bit-Rate Optical Pulse Trains", *IEEE Photonics Technology Letters*, vol. 16, No. 3, Mar. 2004, pp. 858-860.

J. Debeau et al., "Simple Method For The Complete Characterization of an Optical Pulse", *Optics Letters*, vol. 23, No. 22, Nov. 15, 1998, pp. 1784-1786.

L. P. Barry et al., "Optimization of Optical Data Transmitters For 40-Gb/s Lightwave Systems Using Frequency Resolved Optical Grating", *IEEE Photonics Technology Letters*, vol. 14, No. 7, Jul. 2002, pp. 971-973.

P-A Lacourt et al., "Milliwatt-Peak-Power Pulse Characterization at 1.55 μm by Wavelength-Conversion Frequency-Resolved Optical Gating", *Optics Letters*, vol. 27, No. 10, May 15, 2002, pp. 863-865.

(Continued)

*Primary Examiner*—Timothy Thompson
(74) *Attorney, Agent, or Firm*—David A. Sasso

(57) ABSTRACT

A method and apparatus for characterizing light from an optical source using simplified chronocyclic tomography by modulating the phase of light from an optical source using alternating positive and negative quadratic temporal phase modulation at a desired alternating frequency $\Omega$; generating an electric signal proportional to the optical power of the modulated light after propagation through an optical frequency resolving device, for a desired optical frequency $\omega$; determining a time-invariant and time-varying components of the electric signal; repeating the generating and determining steps for a plurality of optical frequencies; and determining the spectral phase and spectral intensity of the light from the optical source using the time-invariant and time-varying components determined for the plurality of optical frequencies.

10 Claims, 3 Drawing Sheets

OTHER PUBLICATIONS

Y. Ozeki et al., "High Dynamic Range Characterization of Waveform and Frequency-Chirp of Pico-Second Pulses Based on the Precise Measurement of Group Delay in Optical Frequency Domain", *OFC 2003*, vol. 2, Friday morning, pp. 725-727.

C. Dorrer et al., "Complete Temporal Characterization of Short Optical Pulses By Simplified Chronocylic Tomography", *Optics Letters*, vol. 28, No. 16, Aug. 15, 2003, pp. 1481-1483.

M. Beck et al., "Chronocyclic Tomography For Measuring the Amplitude and Phase Structure of Optical Pulses", *Optics Letters*, vol. 18, No. 23, Dec. 1, 1993, pp. 2041-2043.

R. P. Feynman et al., *Quantum Mechanics and Path Integrals*, McGraw-Hill Book Company, 1965.

I. Kang et al., "Implementation of Electro-Optic Spectral Shearing Interferometry for Ultrashort Pulse Charazterization", *Optics Letters*, vol. 28, No. 22, Nov. 15, 2003, pp. 2264-2266.

METHOD AND APPARATUS FOR OPTICAL PULSE CHARACTERIZATION USING SIMPLIFIED CHRONOCYCLIC TOMOGRAPHY

CROSS-REFERENCE TO RELATED APPLICATIONS

This application is related to copending application entitled "Method And Apparatus For Characterizing Optical Pulses Using Reduced Complexity Chronocyclic Tomography", application Ser. No. 10/427,839, filed May 1, 2003, which is incorporated herein by reference.

BACKGROUND OF THE INVENTION

1. Field of the Invention

The invention generally relates to the field of optical pulse characterization and, more particularly, to characterizing ultrashort optical pulses using simplified chronocyclic tomography.

2. Description of the Related Art

Traffic growth and the consequent demand for larger capacity optical data transmission systems have historically driven the increase of the per channel data rate of such systems to reduce the transmission cost per bit. Currently, 40 Gb/s transmission systems are commercially available and the feasibility of transmitting at much higher bit rates has been demonstrated.

Measuring and controlling the electric field of optical pulses is essential for ultra high bit rate transmission (e.g. 40 Gb/s+) due to the increased sensitivity to chromatic dispersion and optical nonlinearities. Measuring and controlling the electric field of optical pulses also facilitates the optimization of functions such as all-optical signal processing and nonlinear optical pulse compression.

Conventional optoelectronic photodetection and sampling are currently not capable of providing the time resolution and the phase sensitivity required to properly characterize pulses in an ultra high bit rate telecommunication environment. An effective diagnostic for optical sources in these environments requires time resolution better than 1-ps, and sub-mW sensitivity due to the low peak optical power of pulses used in telecommunication systems. Various characterization techniques have been proposed that rely on a nonlinear interaction, for example sum-frequency generation in a nonlinear crystal. These techniques however, lack the sensitivity required to operate in the telecommunication environment. Further, these techniques usually require an optical delay line, which strongly limits the measurement time of the experimental trace, therefore limiting the update rate of the measured electric field. Finally, some of these techniques are based on an iterative inversion of their experimental trace, and are therefore prone to errors or stagnation of the retrieval algorithm. There is therefore a need for techniques and experimental implementations providing reliable high sensitivity real-time measurement of the electric field of pulses in the telecommunication environment.

A simplified chronocyclic tomography technique has been proposed which allows the direct reconstruction of the electric field of a pulse from only two projections of its Wigner-Ville function. This technique is based on an analytic relation between the spectral intensity of a pulse $I(\omega)$, its spectral phase $\phi(\omega)$, and the angular derivative of the frequency marginal of its rotated Wigner-Ville function. A rotation in the chronocyclic space generally requires quadratic spectral and temporal phase modulations, however, only temporal phase modulations are needed for simplified chronocyclic tomography. Specifically, the quadratic temporal phase modulations $-\psi t^2/2$ and $\psi t^2/2$ lead to a spectral intensity of the field after modulation $I_{-\psi}(\omega)$ and $I_{\psi}(\omega)$. The spectral intensity $I(\omega)$ and spectral phase $\phi(\omega)$ can be reconstructed directly from $I_{-\psi}(\omega)$ and $I_{\psi}(\omega)$ according to:

$$I(\omega) = I_{ave}(\omega) = \frac{I_\psi(\omega) + I_{-\psi}(\omega)}{2} \qquad (1)$$

$$\frac{\partial}{\partial \omega}\left[I(\omega)\frac{\partial}{\partial \omega}\left\{\varphi(\omega) + \frac{\omega^{(2)}\omega^2}{4}\right\}\right] = \frac{\Delta I(\omega)}{2\psi} = \frac{I_\psi(\omega) - I_{-\psi}(\omega)}{2\psi} \qquad (2)$$

In Eq. 2, where $\phi^{(2)}$ is the second order dispersion of the modulating device. It is noted that the right hand sides of the Eqs. 1 and 2 are an approximation for small modulation ($\psi<<1$). Those skilled in the art will appreciate that for pulses with an electric field that would not be significantly modified by the dispersion of the modulating device, Eq. 2 can be simplified by using $\phi^{(2)}=0$.

In practice, negative and positive quadratic temporal phase modulations can be sufficiently approximated using a phase modulator driven by a sinusoidal drive signal synchronized with light pulses from an optical source, with an adjustable timing between the pulses and the modulation. FIGS. 1a and 1b respectively represent such timing adjustment for negative and positive quadratic temporal phase modulation.

Using an implementation of simplified chronocyclic tomography based on an optical spectrum analyzer that sequentially measures the optical spectra $I_{-\psi}(\omega)$ and $I_{\psi}(\omega)$ (FIG. 1c), 2.4-ps pulses from a mode-locked fiber laser were accurately characterized. However, the sensitivity was limited to 1 mW. The slow measurement speed of the scanning optical spectrum analyzer also limited the overall measurement speed. Additionally, since the differential quantity $\Delta I(\omega)=I_{\psi}(\omega)-I_{-\psi}(\omega)$ (FIG. 1d) in Eq. 2, is obtained by sequential measurements of the two optical spectra $I_{\psi}$ and $I_{-\psi}$, the sensitivity of the spectral phase retrieval is limited due to the laser amplitude noise, and thermal and mechanical drifts of the laser and measurement equipment. This is, however, only a particular problem of such sequential implementation of simplified chronocyclic tomography, and the sensitivity would be greatly improved if the differential quantity $\Delta I(\omega)$ could be measured directly.

SUMMARY OF THE INVENTION

These and other deficiencies of the prior art are addressed by the present invention, which provides methods and apparatus for pulse characterization using simplified chronocyclic tomography. Simplified chronocyclic tomography determines the spectral intensity and phase of the electric field of light from an optical source using two optical spectra measured after positive and negative quadratic temporal phase modulation. The present invention provides an improvement of several orders of magnitude in both the sensitivity and measurement speed. These improvements are achieved by modulating the phase of light from an optical source using alternating positive and negative quadratic temporal phase modulation at a desired alternating frequency, generating an electric signal proportional to the optical spectral intensity for a given optical frequency of the modulated light after propagating through an optical frequency resolving device. A time-invariant component of the electric signal and a time-varying component of the electric signal having the desired alternating frequency, are determined. A collection of these time-invariant and time-varying components obtained for a plurality of optical frequencies are proportional to the aforementioned spectra $I_{ave}(\omega)$ and $\Delta I(\omega)$, respectively. The electric field of the light from the optical source is reconstructed from the measured spectra using Eqs. 1 and 2. The measurement speed is improved by the fast scanning of the optical frequency resolving device.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings.

DETAILED DESCRIPTION

Figure 1:
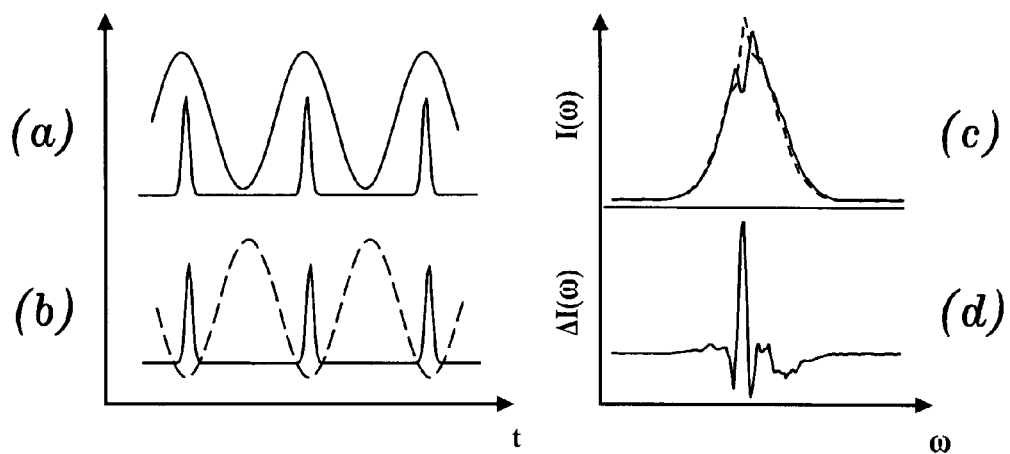
FIGS. 1a–d are plots illustrating aspects of simplified chronocyclic tomography according to the present invention.

Methods and apparatus are provided for characterizing optical pulses using simplified chronocyclic tomography. One or more aspects of the invention relate to a self-referencing technique for characterizing the temporal electric field of short optical pulses. Although the present invention will be described within reference to a diagnostic system for use with optical communications systems, those skilled in the art will appreciate that the present invention may be advantageously implemented in substantially any application where it is desirable to characterize optical pulses.

In one preferred embodiment of the present invention, a method is provided for determining the spectral phase and intensity of light from an optical source. The light from the optical source is modulated alternatively by positive and negative quadratic temporal phase modulation. The alternation between the two modulations is performed at a desired alternating frequency $\Omega$. The modulated light is then sent into a frequency-resolving device that generates an electric signal representative of the spectral intensity of the source for a given optical frequency $\omega$.

In the absence of noise, the generated electric signal has two components, which are, respectively, time-invariant and time-varying. The amplitude of the time invariant component is representative of the average of the spectral intensities of the light from the optical source after positive and negative temporal phase modulation, and is therefore representative of the quantity $I_{ave}(\omega)$ used in Eq. 1, discussed above, to reconstruct the spectral intensity of the light from the optical source.

The amplitude of the time-varying component is representative of the difference between the spectral intensities of the light from the optical source after positive and negative temporal phase modulation, and is therefore representative of the quantity $\Delta I(\omega)$, used in Eq. 2 to determine or reconstruct the spectral phase of the light from the optical source. Those skilled in the art will appreciate that such retrieval of a differential quantity from a modulated signal can be achieved with high sensitivity and accuracy since one knows exactly at which frequency (the desired alternating frequency $\Omega$) the differential information is encoded. This allows the removal of most of the noise, which is located at all frequencies and can be filtered by using narrowband detection around $\Omega$. Finally, it is noted that the differential signal $\Delta I(\omega)$ is obtained directly, i.e. not as a difference between the two sequentially measured spectra $I_\psi(\omega)$ and $I_{-\psi}(\omega)$. This allows an increase in robustness to noise, since fluctuations in these two independent spectra are removed.

The frequency-resolving device is tuned to a plurality of optical frequencies covering the spectral support of the light from the optical source in order to measure the average and difference signals $I_{ave}(\omega)$ and $\Delta I(\omega)$, over the spectral bandwidth of the light from the optical source. The intensity and spectral phase of the light from the optical source under test are then determined using Eq. 1 and Eq. 2.

Figure 2:
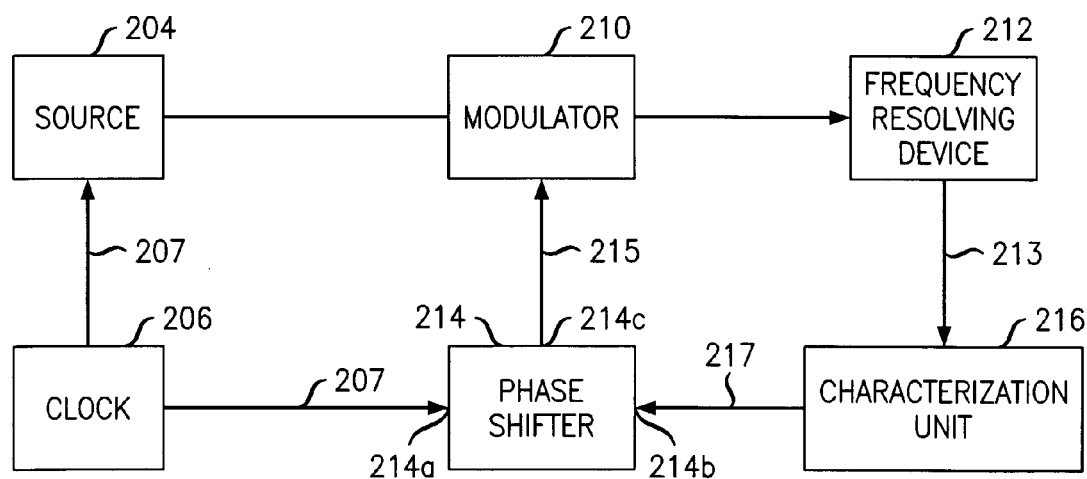
FIG. 2 is a block diagram showing one embodiment of a diagnostic system in accordance with an embodiment of the invention.

FIG. 2 depicts a block diagram showing one embodiment of a diagnostic system 200 in accordance with one or more aspects of the invention. The diagnostic system 200 may be beneficially employed with optical communications systems to characterize optical pulses. The diagnostic system 200 illustratively comprises an optical source 204, a clock 206, a modulator 210, a frequency-resolving device 212, a phase shifter 214, and a characterization unit 216.

The clock 206 is preferably a radio frequency (RF) clock (hereinafter RF clock 206) which generates an RF clock signal 207 having a desired frequency. The light output from the source 204 is preferably a train of substantially identical optical pulses with repetition rate equal to the frequency of the RF clock signal 207 produced by the RF clock 206. The optical source 204 may be an actively mode-locked fiber laser or any similar type of optical source known or used in the art. Alternatively, the optical source 204 may be a continuous-wave laser, the output of which is modulated using an optical modulator, such as a Mach-Zehnder modulator (MZM), to produce a train of optical pulses. The light from the optical source 204 can also be obtained after propagation in fibers or devices (not shown).

A first input 214a of the phase shifter 214 is coupled to the RF clock 206 for receiving an RF clock signal 207. A second input 214b of the phase shifter 214 is coupled to the characterization unit 216 for receiving a phase control signal 217. An output 214c of the phase shifter 214 provides a drive signal 215, which is coupled to the modulator 210. The phase control signal 217 controls the phase of the drive signal 215 with respect to the RF clock signal 207.

The phase shifter 214 may be, for example, a voltage-controlled phase shifter, and the phase control signal 217 may be a voltage signal. Those skilled in the art will appreciate that other types of phase shifters or delay units known or used in the art may be employed. The phase shifter 214 preferably supplies a drive signal 214 to the modulator 210 that is either synchronized, or delayed by a predetermined amount, with respect to the RF signal 207 that is used to drive the optical source 204.

The optical source 204 is also coupled to the modulator 210. The modulator 210 receives light from the optical source 204, and the drive signal from the phase shifter 214. The phase shifter 214 therefore essentially controls the phase of the modulation induced by the modulator 210 on the light from the optical source 204. The modulator 210 may be a Lithium Niobate temporal phase modulator or the like. The output of the modulator 210 is phase modulated light, which is input into the frequency-resolving device 212.

The frequency-resolving device 212 may be an optical spectrum analyzer (OSA). Alternatively, the frequency-resolving device 212 may be implemented using a Fabry-Perot etalon followed by a photodiode. The frequency-resolving device 212 outputs an electric signal 213 that is proportional to the spectral intensity of the light received from the modulator 210 at an optical frequency ω.

The characterization unit 216 is coupled to the frequency-resolving device 212 for receiving the electric output signal 213 from the frequency-resolving device 212. The characterization unit 216 is also coupled to the phase shifter 214 for providing the phase control signal 217. Those skilled in the art will appreciate that the characterization unit 216 may comprise various devices known in the art for generating the phase control signal 217 for tuning the phase shifter 214, and for processing the electric output signal 213. The characterization unit 216 may be implemented in hardware, software, or a combination of hardware and software. Such implementations may include a number of processors independently executing various programs and dedicated hardware.

Using the phase control signal 217, the characterization unit 216 causes the phase shifter 214 to shift the phase of the drive signal 215 with respect to the RF clock signal 207. In this manner, the characterization unit 216 controls the synchronization of the modulation induced by the modulator 210 with respect to the light from the optical source 204. The phase of the drive signal 215 is controlled so that the light from the optical source 204 is synchronized either with a maximum or a minimum of the modulation induced by the modulator 210. These two timing configurations correspond respectively to negative and positive quadratic temporal phase modulations of the light from the optical source 204. Alternation between these two timing configurations is obtained by alternation of the phase control signal 217 at a desired alternating frequency Ω.

The characterization unit 216 then determines a time-invariant component of the electric signal 213 from the frequency-resolving device 212, and a time-varying component of the electric signal 213 that varies at the desired alternating frequency. Illustratively, such determination can be implemented by various filters and synchronous detection at the alternating frequency. Alternatively, the electric signal 213 can be measured and numerically processed by the characterization unit 216, using, for example, Fourier transforms algorithms.

The time-varying and time-invariant components of the electric signal 213 from the frequency-resolving device 212 are determined by the characterization unit 216 for a plurality of optical frequencies. This is achieved by tuning the frequency-resolving device 212 to various optical frequencies and repeating the same procedure to determine the time-varying and time-invariant components of the electric signal 213. The characterization unit 216 then determines the spectral phase and spectral intensity of the light from the optical source 204 using the time-invariant components and the time-varying components of the electrical output signals 213.

Figure 3:
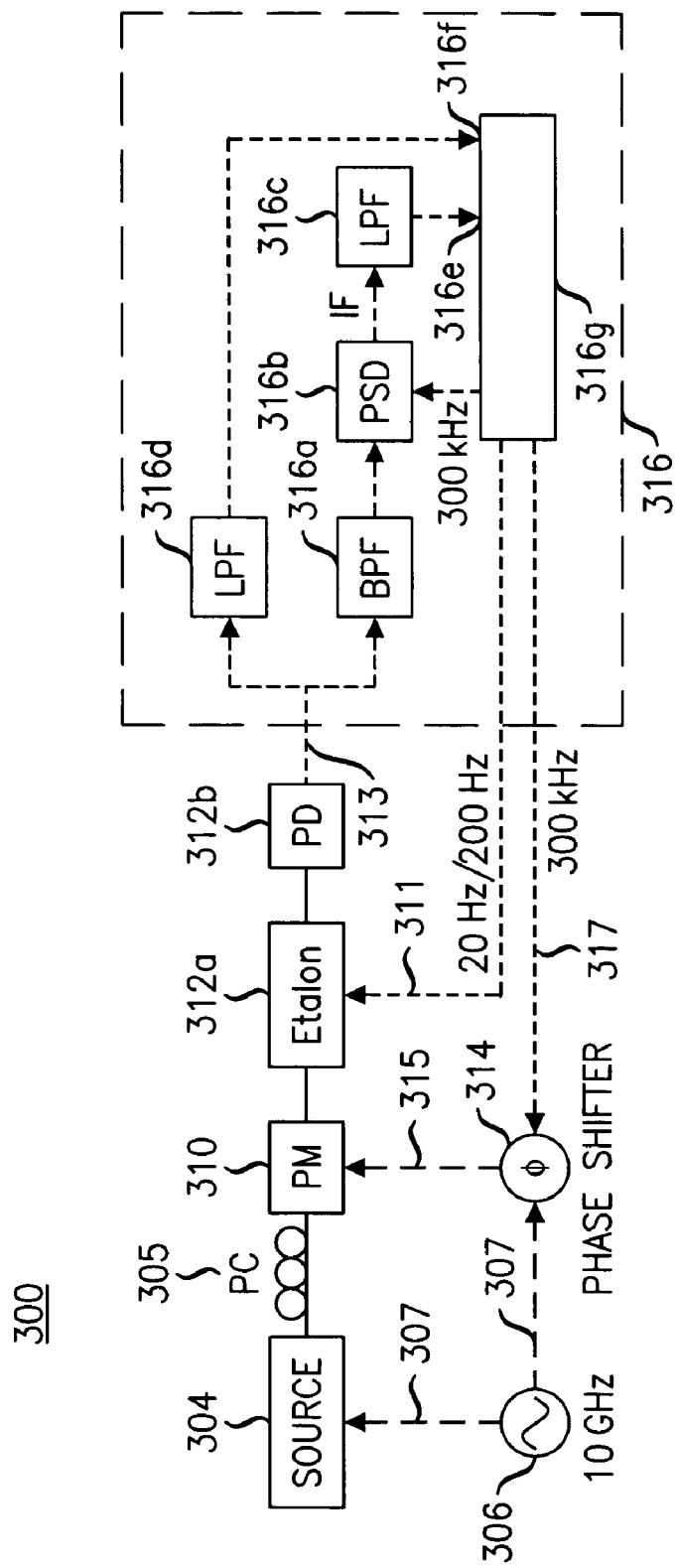
FIG. 3 is a block diagram showing an experimental apparatus in accordance with one or more aspects of the invention.

Experimental testing was conducted to confirm aspects of embodiments of the present invention. FIG. 3 is a block diagram showing an experimental apparatus 300. Light from a source under test 304 was coupled to a lithium niobate phase modulator (PM) 310 sinusoidally driven at 10 GHz with a drive signal 315 after polarization alignment with the polarization controller (PC) 305. The relative delay between the light from the source under test 304 in the PM 310 and the drive signal 315 of the PM 310 was adjusted with a voltage-controlled RF phase shifter 314. The optical spectrum (i.e. spectral intensity) was measured with a fast-scanning Fabry-Perot etalon 312a (50-pm resolution, free spectral range >60 nm) followed by an InGaAsP P-I-N diode (PD) 312b.

The quantities $\Delta I(\omega)=I_{\psi}(\omega)-I_{-\psi}(\omega)$ and $I_{ave}(\omega)=[I_{\psi}(\omega)+I_{-\psi}(\omega)]/2$ (of Eqs. 1 and 2 discussed above) were measured as follows. The etalon 312a was scanned by a periodic ramp voltage at either 20 Hz or 200 Hz in order to provide tuning of the optical frequency (using a scanning signal 311 from the characterization unit 316). The phase shifter 314 was controlled with a square-wave voltage 317 from the characterization unit 316 with alternating frequency $f_{mod}$=300 kHz so that alternate synchronization of the pulse under test with the maximum and minimum of the 10 GHz RF sinusoidal drive is obtained (as discussed above with reference to in FIG. 1(a) and (b)). A computer was used to drive both the voltage-controlled phase shifter 314 and the etalon 312a via two D/A ports of a data acquisition board in a computer (not shown). The electric signal 313 from the photodiode 312b was split in order to determine its time-varying and time-invariant component.

The time-varying component of the electrical signal 313 from the PD 312b (which corresponds to the differential spectral signal $\Delta I(\omega)$), was determined by band-pass filtering (with band-pass filter (BPF) 316a) around the alternating frequency $f_{mod}$, synchronous detection by a phase-sensitive detector (PSD) 316b, and low-pass filtering of its output (IF) (~1 kHz for 20 Hz etalon scanning rate, using a low-pass filter (LPF) 316c) to reduce the noise. A lock-in amplifier was used for the PSD 316b. Alternatively, a simple double-balanced mixer can be used as the PSD 316b. The time-invariant component of the electrical signal 313 from the PD 312b, which corresponds to the average signal $I_{ave}(\omega)$ was determined by low-pass filtering (LPF ~1 kHz for 20 Hz etalon scanning rate, using a LPF 316d).

Two A/D ports 316e, 316f of an acquisition board in a computing device 316g in the characterization unit 316 were used to measure the output of the LPFs 316c, 316d as a function of time, and the differential and average signals $\Delta I(\omega)$ and $I_{ave}(\omega)$ were determined. The output of 316d is proportional to $I_{ave}(\omega)$ and the output of 316c is proportional to $\Delta I(\omega)$. It is noted that the scanning speed of the Fabry-Perot etalon is sufficiently slow in comparison to the alternating frequency Ω such that $I_{ave}(\omega)$ and $\Delta I(\omega)$ are simultaneously determined in a single scan of the frequency resolving device. The computing device 316g then reconstructs the electric field of the light from a source under test 304 using Eqs. 1 and 2.

The light from a source under test 304 was derived from a semiconductor laser actively mode-locked at 10-GHz repetition rate delivering pulses around 1550 nm. The accuracy of the characterization discussed above was validated by examining the spectral phases accrued by the light from the source under test 304 traveling through known dispersive elements.

Figure 4:
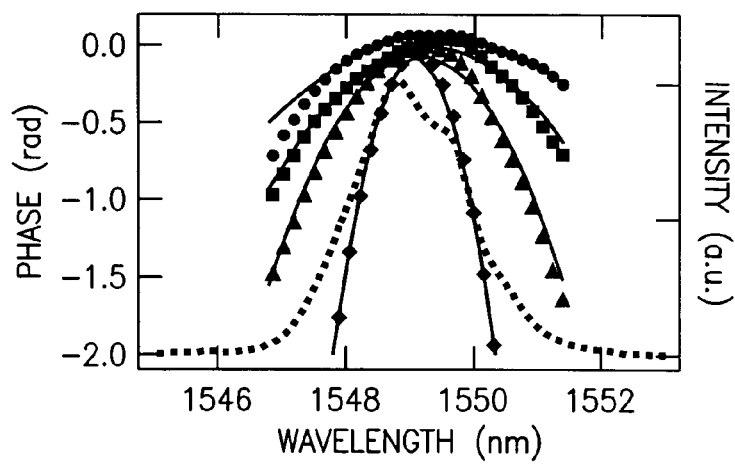
FIG. 4 is a plot showing the spectral intensity (dashed curve) of a pulse and spectral phases induced by linear propagation in 12-m (circles), 22-m (squares), 42-m (triangles), and 180-m (diamonds) of standard single mode fiber (SSMF)

The differences in spectral phase measured before and after traveling through 12, 22, 42, and 180 meters of Standard Single Mode Fiber (SSMF) are shown in FIG. 4. The data in FIG. 4 were obtained with 50-μW optical power at an input of the PM 310, and the complete electric field was recovered at 10 Hz with the etalon 312a scanning at 20 Hz.

The measured spectral phase differences were compared to the expected quadratic spectral dispersion calculated using the known chromatic dispersion of SSMF (17 ps/nm/km at 1550 nm) and the measurement accuracy was quantified by the root-mean-square (RMS) phase errors within the spectral support where the spectral intensity is larger than 5% of the peak spectral intensity. The measured RMS errors for the data were typically 0.04 radians and are less than 0.06 radians for all cases. This high measurement accuracy is enabled by the capability of the lock-in method of detecting the small changes in the spectral intensity, $\Delta I(\omega)$, which largely determines the accuracy of the reconstruction of the spectral phase in the tomographic techniques according to embodiments of the invention.

Figure 5A:
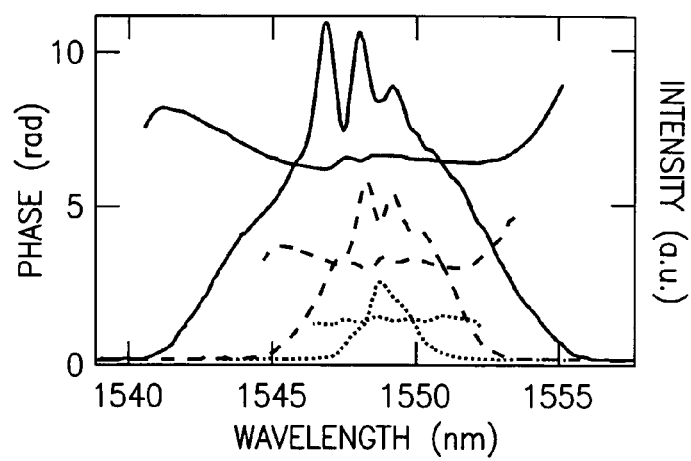
FIG. 5a is a plot showing the spectral phase and intensity of a mode-locked laser pulses (dotted), the pulses after an all-fiber compressor at 82 mW average input power to highly nonlinear fiber (HNLF) (dashed), and the pulses after a fiber-grating compressor at 200 mW average input power to HNLF (solid)
Figure 5B:
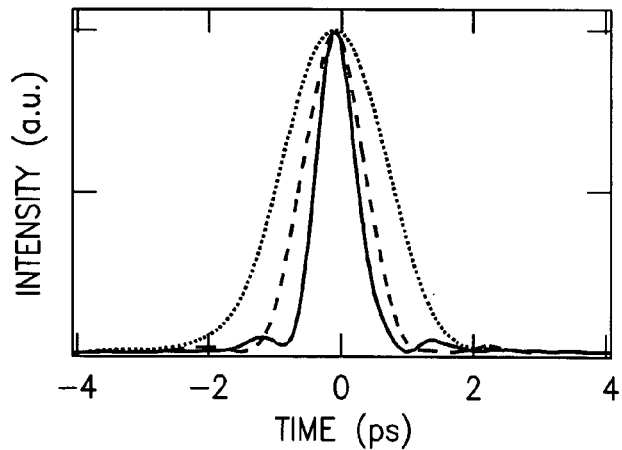
FIG. 5b is a plot showing the temporal intensity of a mode-locked laser pulses (dotted), the pulses after an all-fiber compressor (dashed), and the pulses after a grating compressor (solid).

The techniques according to the present invention can also be applied to the characterization of sub-picosecond pulses. In additional experimental testing, sub-picosecond pulses were obtained by, recompressing 1.9-ps pulses from an actively mode locked laser (e.g. optical source 304) using self-phase modulation. The spectral broadening was achieved in 500 meters of highly nonlinear fiber (HNLF) with D=−4.5 ps/nm/km, and the nonlinear propagation coefficient γ=10/W-km. The pulse recompression was achieved using either an all fiber compressor comprising 130 meters of SSMF (dashed curves in FIGS. 5a,b) or a free-space grating compressor (solid curves in FIGS. 5a,b). FIG. 5a is a plot showing the spectral phase and intensity of the mode-locked laser pulses (dotted), the pulses after the all-fiber compressor at 82 mW average input power to highly nonlinear fiber (HNLF) (dashed), and the pulses after the grating compressor at 200 mW average input power to HNLF (solid). FIG. 5b is a plot showing the temporal intensity of the mode-locked laser pulses (dotted), the pulses after the all-fiber compressor (dashed), and the pulses after the grating compressor (solid).

The fast measurement speed allowed easy adjustment of the launch power for optimal recompression in the case of the fiber compressor or the grating distance in the case of the grating compressor. The optimal pulse compression for the fiber compressor yielded 1.1-ps pulses at 82-mW launch power into the HNLF, while 680-fs pulses were obtained for 200-mW average launch power with the grating pulse compressor.

From the experimentation discussed above those skilled in the art will appreciate that the methods and apparatus of the present invention provide for highly sensitive real-time temporal diagnostics of short pulses based on simplified chronocyclic tomography. The accuracy of ~0.04 radians in spectral phase recovery at 10 Hz was achieved.

It will be apparent to those skilled in the art that while a common 10 GHz RF clock (i.e. drive signals 307) has been used to drive the optical source (204, 304) and the phase shifter (214, 314) in the various embodiments described herein, a free-running optical source, such as a passively mode-locked fiber laser, can also be characterized by combining the method of simplified chronocyclic tomography with alternating modulation and a clock recovery circuit used to generate a drive signal to drive the modulator synchronously with the optical source.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

The invention claimed is:

1. A method, comprising:
   (a) modulating the phase of light from an optical source using alternating positive and negative quadratic temporal phase modulation at a desired alternating frequency $\Omega$;
   (b) generating an electric signal proportional to the optical power of the modulated light after propagation through an optical frequency resolving device, for a desired optical frequency $\omega$;
   (c) determining a time-invariant component of the electric signal and a time-varying component of the electric signal having the desired alternating frequency $\Omega$;
   (d) repeating steps (b) and (c) for a plurality of optical frequencies; and
   (e) determining the spectral phase and spectral intensity of the light from the optical source using the time-invariant components and the time-varying components of the electric signals determined for the plurality of optical frequencies.

2. The method of claim 1, wherein the time-invariant components are representative of the spectral intensity of the light from the optical source.

3. The method of claim 1, wherein the time-varying components are representative of $$\frac{\partial}{\partial \omega}\left[I(\omega)\frac{\partial}{\partial \omega}\left\{\varphi(\omega) + \frac{\varphi^{(2)}\omega^2}{4}\right\}\right]$$

where ω represents angular optical frequency, I(ω) is the spectral intensity of the light from the optical source, φ(ω) is the spectral phase of the light from the optical source, and φ$^{(2)}$ is the second order dispersion of a device used for modulating the light from the optical source.

4. The method of claim 1, wherein the modulating the light from the optical source comprises:
   coupling the light from the optical source to a phase modulator; and
   driving the phase modulator with a sinusoidal RF signal.

5. The method of claim 4, wherein alternating positive and negative quadratic temporal phase modulation is achieved by modifying the delay between the sinusoidal RF signal and the light from the optical source.

6. An apparatus, comprising:
   means for modulating the phase of light from an optical source using alternating positive and negative quadratic temporal phase modulation at a desired alternating frequency $\Omega$;
   means for generating an electric signal proportional to the optical power of the modulated light after propagation through an optical frequency resolving device, for a desired optical frequency $\omega$;

means for determining a time-invariant component of the electric signal and a time-varying component of the electric signal having the desired alternating frequency $\Omega$; and means for determining the spectral phase and spectral intensity of the light from the optical source using time-invariant components and time-varying components of electric signals from the means for generating an electric signal, determined for a plurality of optical frequencies.

7. An apparatus, comprising:

an optical phase modulator for modulating the phase of light from an optical source a device for effectively alternating the phase modulation of the optical phase modulator between positive and negative quadratic temporal phase modulation at a desired alternating frequency;

a frequency-resolving device for generating an electric signal proportional to the optical power of the modulated light from the optical phase modulator for a desired optical frequency;

a characterization unit for determining a time-invariant component and a time-varying component having the desired alternating frequency of the electric signal from the frequency-resolving device, and for determining the spectral phase and spectral intensity of the light from the optical source using time-invariant components and time-varying components of electric signals from the frequency-resolving device, determined for a plurality of optical frequencies.

8. The apparatus of claim 7, wherein the optical phase modulator is a lithium niobate modulator driven by an RF sinusoidal drive signal.

9. The apparatus of claim 7, wherein the device for effectively alternating the phase modulation of the optical phase modulator comprises an RF phase shifter.

10. The apparatus of claim 7, wherein the frequency-resolving device comprises a Fabry-Perot etalon and a photodiode.

* * * * *